US011863016B2

(12) United States Patent
To et al.

(10) Patent No.: US 11,863,016 B2
(45) Date of Patent: Jan. 2, 2024

(54) ELECTRIC MOTOR

(71) Applicant: GKN Sinter Metals Engineering GmbH, Radevormwald (DE)

(72) Inventors: Hong Giang To, Düsseldorf (DE); Stefan Tiller, Sankt Augustin (DE); Maurice Andree, Neukirchen-Vluyn (DE)

(73) Assignee: GKN Sinter Metals Engineering GmbH, Radevormwald (DE)

( * ) Notice: Subject to any disclaimer, the term of this patent is extended or adjusted under 35 U.S.C. 154(b) by 15 days.

(21) Appl. No.: 17/423,675

(22) PCT Filed: Jan. 17, 2020

(86) PCT No.: PCT/EP2020/051188
§ 371 (c)(1),
(2) Date: Jul. 16, 2021

(87) PCT Pub. No.: WO2020/148449
PCT Pub. Date: Jul. 23, 2020

(65) Prior Publication Data
US 2022/0094214 A1  Mar. 24, 2022

(30) Foreign Application Priority Data
Jan. 18, 2019   (DE) ..................... 10 2019 101 270.8

(51) Int. Cl.
*H02K 1/14*   (2006.01)
*H02K 21/20*   (2006.01)

(52) U.S. Cl.
CPC ............. *H02K 1/145* (2013.01); *H02K 21/20* (2013.01); *H02K 2201/12* (2013.01)

(58) Field of Classification Search
CPC ..... H02K 1/145; H02K 21/20; H02K 2201/12
(Continued)

(56) References Cited

U.S. PATENT DOCUMENTS 4,707,910 A   11/1987  Saeed
5,402,028 A    3/1995  Koeber et al.
(Continued)

FOREIGN PATENT DOCUMENTS

CN   106961169 A  *  7/2017
CN   106961169 A1    7/2017
(Continued)

OTHER PUBLICATIONS

PCT International Search Report and Written Opinion, PCT/EP2020/051188, dated Mar. 31, 2020, 20 pages.
(Continued)

*Primary Examiner* — Jose A Gonzalez Quinones
(74) *Attorney, Agent, or Firm* — Quarles & Brady LLP

(57) ABSTRACT

An electric motor having a rotor with an axis of rotation and an annular stator surrounding the rotor, the stator extending along an axial direction parallel to the axis of rotation and having a first end face and a second end face pointing in opposite axial directions. The stator has exactly two stator teeth extending from an annular circumferential surface that runs between the end faces of the stator, in a radially inward direction to the rotor and facing one another in relation to the axis of rotation, a first stator slot and a second stator slot, which faces the first slot in relation to the axis of rotation, extending along the circumferential surface, between the stator teeth.

10 Claims, 2 Drawing Sheets

(58) Field of Classification Search
USPC .......................................... 310/156, 2, 214
See application file for complete search history.

(56) References Cited

U.S. PATENT DOCUMENTS

2008/0007070 A1* 1/2008 Edelson ................... F03D 9/25
290/55
2012/0248927 A1 10/2012 Li et al.

FOREIGN PATENT DOCUMENTS

| | | |
|---|---|---|
| DE | 102010011924 A1 | 9/2011 |
| DE | 102017011853 A1 | 5/2018 |
| EP | 2072824 A2 | 6/2009 |
| EP | 2590302 A1 | 5/2013 |
| EP | 2731241 A * | 5/2014 |
| EP | 2731241 A1 | 5/2014 |
| JP | S56117568 A | 9/1981 |
| JP | H10234153 A | 9/1998 |
| JP | H10322992 A | 12/1998 |
| JP | 2005012956 A | 1/2005 |
| JP | 2014217163 A | 11/2014 |
| JP | 2016086508 A | 5/2016 |
| WO | 2016066714 A2 | 5/2016 |

OTHER PUBLICATIONS

Japan Patent Office, Notice of Reasons for Refusal, Application No. 2021-541258, dated Jul. 26, 2022, 9 pages.

* cited by examiner

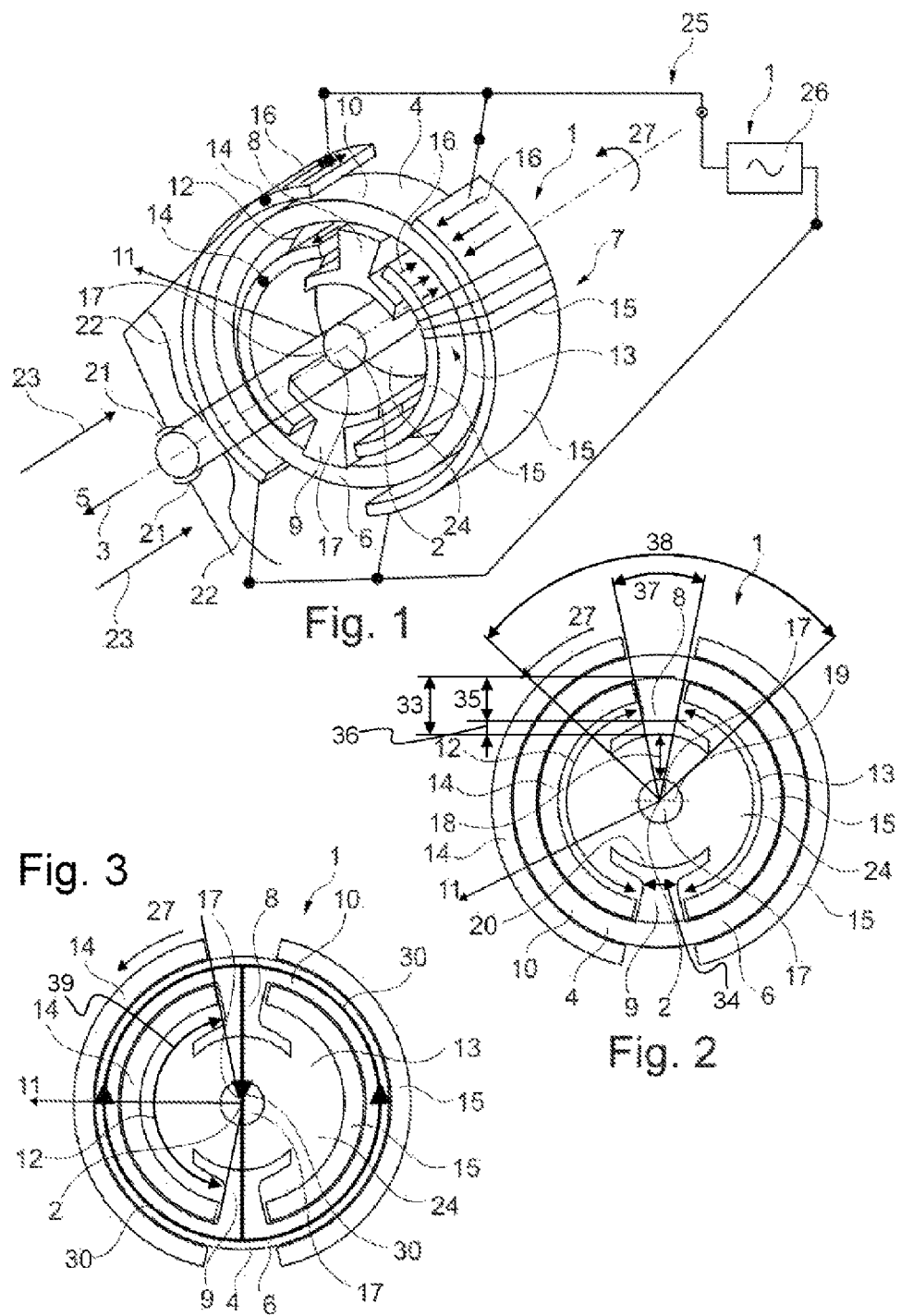

ELECTRIC MOTOR

This application represents the U.S. national stage entry of International Application No. PCT/EP2020/051188 filed Jan. 17, 2020, which claims priority to German Patent Application No. 10 2019 101 270.8 filed Jan. 18, 2019, the disclosure of which is incorporated herein by reference in its entirety and for all purposes.

The present invention relates to an electric motor, wherein the electric motor comprises at least one stator and one rotor. In particular, the electric motor is a radial flux motor (RFM).

EP 2 072 824 A2 discloses an electric motor for conveying gaseous or liquid media. The stator has at least two stator teeth which are arranged between the stator slots. Coils are arranged in the stator slots. The stator slots also serve, at least partially, as media throughflow openings.

When guiding a medium through the stator slots, eddying of the medium may occur on account of the large number of openings and the inhomogeneous surface. As a countermeasure, the air gap of the motor could be designed to be large and this air gap could be used exclusively as the throughflow opening. In this case, additional casting can help to keep the surface homogeneous.

However, electrical machines with a large air gap encounter the problem that large magnetic stray fluxes occur. In known radial flux motors, a complicated, distributed winding is provided for the purpose of reducing the stray fluxes. This approach is costly, in particular in machines with little installation space.

Proceeding from this, the object of the present invention is at least to mitigate or even to solve the problems outlined with respect to the prior art. In particular, one aim is to specify an electric motor which is of compact construction and has as large an intermediate space as possible, that is to say in particular as large a cross section through which media can flow as possible, as well. A simultaneous aim is to ensure electrical operation of the motor in an efficient a manner as possible. In particular, the magnetic stray fluxes are to be kept low and a winding which is as simple as possible is to be realized.

An electric motor according to the features of claim 1 is proposed for achieving these objects. The dependent claims relate to advantageous developments. The features listed individually in the claims can be combined with one another in any technologically feasible manner and can be supplemented by explanatory facts from the description and details from the figures, wherein further embodiment variants of the invention are indicated.

The invention proposes an electric motor, at least having a rotor with a rotation axis and having an annular stator which surrounds the rotor. The stator extends along an axial direction that is parallel to the rotation axis and respectively has a first end side and a second end side that point in opposite axial directions (that is to say a first end side that points in a first axial direction and a second end side that points in a second axial direction). The stator has precisely or only two stator teeth which, starting from an annular circumferential surface of the stator, which circumferential surface extends between the end sides, extend along a radial direction inward toward the rotor and are arranged opposite one another with respect to the rotation axis (that is to say offset through 180 angular degrees in relation to one another in a circumferential direction). A first stator slot and a second stator slot, which is arranged opposite with respect to the rotation axis, extend along the circumferential surface between the stator teeth. At least one first winding (or a plurality of first windings) is arranged in the first stator slot and at least one second winding (or a plurality of second windings) is arranged in the second stator slot, wherein each winding extends over the end sides and on the outside and on the inside in the radial direction around the annular circumferential surface.

In particular, the at least one first winding is arranged only in the first stator slot and the at least one second winding is arranged only in the second stator slot.

The stator of the electric motor has, in particular, a soft-magnetic material, for example what is known as "Soft Magnetic Composite" (SMC), or a combination of electrical sheets and SMC. The SMC material is not sintered here. Instead, the temperature is controlled to below a melting point, but is sufficient for the stator to maintain its geometry permanently.

The stator has a substantially annular main body (also called the circumferential surface below), starting from which two stator teeth extend inward in the radial direction.

The rotor can have one or more one permanent magnets and/or soft-magnetic elements. Permanent magnets can preferably be used to form a permanently excited synchronous or brushless DC motor, abbreviated to BDLC, while, for example, soft-magnetic elements can be used to produce a reluctance motor as the electric motor.

The design of a stator, in particular using SMC, as well as further details, also relating to a rotor, can be found, for example, in WO 2016/066714 A1, and therefore the explanations provided there can also be used for understanding or describing the stator.

The electric motor has, in particular, an electrical power consumption (that is to say a maximum drive power) of less than 20,000 watts (rated power), preferably of less 1000 watts, particularly preferably of less than 100 watts.

In particular, it is proposed here that the windings do not extend around the stator teeth, but rather around the annular circumferential surface or the annular main body. In particular, the windings are arranged next to one another along the circumferential direction, wherein the winding direction runs substantially along the axial direction and along the radial direction. At least when the windings are connected in series, the windings also have a profile component in the circumferential direction.

In particular, the first winding and the second winding are arranged in relation to one another (or connected to one another) such that an electric current can flow through them in opposite directions.

This preferred arrangement of the windings allows a magnetic flux to be conducted through the stator teeth along the annular circumferential surface, that is to say along the circumferential direction, and along the radial direction.

In particular, the first winding and the second winding are arranged in relation to one another and electrically connected to one another such that a magnetic flux, which can be generated by the respective winding during operation (of the electric motor), is directed through the circumferential surface along opposite circumferential directions in the region of the stator slots and is added up in the region of the stator teeth and can be conducted across the stator teeth and the rotor along the radial direction.

In particular, the electric motor is operated with a single-phase current.

According to a first embodiment, the at least one first winding and the at least one second winding are connected to one another (electrically) in parallel.

In particular, the first winding and the second winding are windings that are independent of one another.

According to a second embodiment, the at least one first winding and the at least one second winding are connected to one another (electrically) in series. The first winding and the second winding are preferably formed by a continuous winding (that is to say are designed in one part with one another).

In particular, a plurality of windings are arranged in each stator slot, wherein at least the windings of one stator slot (that is to say first windings in first stator slot or second windings in the second stator slot) are connected to one another in parallel or in series.

In particular, it is also possible for only some of the first or second windings of one stator slot to be connected to one another in series or in parallel, while the other first or second windings of the stator slot are connected in a different way. It is also possible to make connections of windings that differ from one another in the first stator slot and in the second stator slot.

In particular, an identical number of windings are arranged in the two stator slots.

One winding extends, in particular, at least along the axial direction along the circumferential surfaces and along the radial direction beyond the end sides of the annular stator and in so doing over the end sides and in the radial direction on the outside and on the inside around the circumferential surface. Individual windings are arranged adjacent to one another along the circumferential direction.

The arrangement of the windings through which an electric current flows in opposite directions in stator slots that are separated from one another by the two stator teeth allows the magnetic flux to be conducted along the circumferential direction through the main body and through the winding toward the stator tooth. At the stator tooth, the magnetic flux (or the field lines) exits from the windings of the opposite stator slots and is guided along the radial direction through the stator tooth toward the rotor and across the rotor toward the other stator tooth. At this other stator tooth, the magnetic flux is guided to the main body and there passed on through the windings and through the main body in the circumferential direction. The different polarized ends of each winding or of the electrical conductor that forms the at least one winding in the respective stator slot are therefore at a maximum distance from one another, and therefore a stray field is as small as possible. One end of the electrical conductor of a stator slot is in particular arranged in the immediate vicinity of one stator tooth, and the other end of the electrical conductor is arranged in the immediate vicinity of the other stator tooth.

In particular, in this embodiment of an electric motor, a stray field can be kept small, wherein an air gap between the stator tooth and the rotor can be designed to be particularly large. Therefore, the diameter of the rotor can be designed to be small, and therefore a large throughflow cross section can be realized in the electric motor.

In particular, the rotor has (in the circumferential direction) at least one (permanent) magnet or at least two magnetic poles (formed on one permanent magnet) which is magnetized in the radial direction. The rotor has, in particular, two poles, that is to say a north pole and a south pole. The poles are, in particular, arranged offset through 180 angular degrees in relation to one another along the circumferential direction and point in opposite radial directions.

In particular, the rotor has two poles and is radially magnetized. In particular, the magnetic field lines run along the radial direction in the region of each pole. That is to say, in particular, (all of the) magnetic field lines of one pole run in each case perpendicularly (or substantially perpendicularly) to an outer circumferential surface of the rotor.

In particular, the rotor is of annular configuration and therefore can be arranged on a shaft which extends through the rotor along the rotation axis. The poles form, in particular, ring segments.

In particular, the rotor has a boundary between the poles, which boundary runs in a plane that extends along the axial direction and along the radial direction and in this way divides the rotor, in particular, into two halves.

This can have the effect that the rotor, in an inoperative state of the electric motor (that is to say windings are de-energized) is oriented in relation to the two stator teeth such that the magnetic field lines of the poles of the rotor are short-circuited by means of the stator teeth. In this case, the rotor is, in particular, oriented such that the boundary of the rotor is arranged in alignment with the extent of the two stator teeth in the radial direction.

However, in this orientation, a torque maximum is also present for the energized state of the stator, that is to say during operation of the electric motor, so that a very good startup behavior of the electric motor can be realized even for operation with a single-phase current.

In particular, a smallest distance between an outer circumferential surface of the rotor and inner circumferential surface of the stator teeth is at least 5 millimeters, in particular at least 10 millimeters, preferably between 5 and 20 millimeters, particularly preferably between 10 and 15 millimeters.

In particular, at least one of the stator teeth, preferably both, particularly preferably both identically, starting from an annular circumferential surface of the stator, which circumferential surface extends between the end sides, extends/extend along a radial direction inward toward the rotor as far as an inner circumferential surface of the stator tooth. Along this extent, the stator tooth has, in particular, a tapered portion with respect to the circumferential direction, i.e. a width of the stator tooth, which width extends in the circumferential direction, is at minimum between the circumferential surface of the stator or of the main body, which circumferential surface points inward in the radial direction, and the inner circumferential surface of the stator tooth.

In particular, the inner circumferential surface of the at least one stator tooth is of wider design along the circumferential direction than the region of the stator tooth between the circumferential surface of the stator and the tapered portion.

The stator tooth extends along the radial direction and, starting from the circumferential surface of the stator or from the main body (or from a projection), over a first section toward the tapered portion and, starting from the tapered portion, over a second section toward the inner circumferential surface.

In particular, a largest width of the stator tooth, which width extends along the circumferential direction, in the region of the first section is up to 50% greater than the width of the tapered portion. In particular, the greatest width is between more than 100% and 150%, preferably between 120% and 150%, of the width of the tapered portion. In particular, the greatest width is arranged at the transition between the circumferential surface or the annular main body and the stator tooth.

In particular, the second section extends over a second angular range, which exceeds a greatest first angular range of the first section by at least 20%, preferably by at least 50%, particularly preferably by at least 75%, particularly preferably by at least 100% or even by at least 150%, in the circumferential direction. The first and the second angular range are each determined, in particular, starting from a rotation axis of the motor.

In particular, the first angular range extends over at most 40 angular degrees, preferably over at most 25 angular degrees.

In particular, the second angular range extends over at least 50 angular degrees, preferably over at least 75 angular degrees, particularly preferably over at least 80 angular degrees.

In particular, the second angular range extends over at most 120 angular degrees, preferably over at most 100 angular degrees.

The first section as far as the tapered portion extends, starting from the circumferential surface of the stator or of the main body and along the radial direction, inward in particular beyond the at least one winding.

The first section comprises, in particular, at least 40%, preferably at least 60%, particularly preferably at least 75%, of the extent of the stator tooth along the radial direction. In particular, the second section comprises at least 5% of the extent, preferably at least 10%.

In particular, the smallest distance between an outer circumferential surface of the rotor and an inner circumferential surface of at least one stator tooth is more than 50%, in particular more than 75%, preferably more than 80%, of the extent of the first section along the radial direction. In particular, the smallest distance is at most 150%, preferably at most 120%, particularly preferably at most 100%, of the extent of the first section along the radial direction.

In particular, the smallest distance between an outer circumferential surface of the rotor and an inner circumferential surface of at least one stator tooth is more than 5%, in particular more than 15%, preferably more than 20%, of a largest outer diameter of the circumferential surface of the stator (or of the main body) along the radial direction.

In particular, the smallest distance between an outer circumferential surface of the rotor and an inner circumferential surface of at least one stator tooth is less than 30%, in particular less than 25%, of a largest outside diameter of the circumferential surface of the stator (or the main body) along the radial direction.

In particular, at least one of the stator slots, preferably both, particularly preferably both identically, extends/extend over a third angular range along the circumferential direction of at least 120 angular degrees, preferably at least 150 angular degrees and preferably less than 180 angular degrees. The third angular range is ascertained, in particular, starting from a rotation axis of the motor.

In particular, the at least one winding, which extends around the circumferential surface of the stator and is arranged only in one stator slot, extends over a proportion of at least 50%, preferably of at least 75%, particularly preferably of at least 90%, of this third angular range.

In particular, at least one of the stator teeth, preferably both, particularly preferably both identically, extends/extend beyond the at least one end side (preferably beyond both end sides) along the axial direction and forms a projection. This projection with respect to the at least one end side of the stator or the circumferential surface or the main body extends, in particular, over the entire extent of the at least one stator tooth along the radial direction. Therefore, in particular, the inner circumferential surface of the at least one stator tooth, which inner circumferential surface is situated opposite the rotor, can be increased in size, so that, with a given electric current, a magnetic flux density in the region of the inner circumferential surface of the at least one stator tooth can be reduced and a magnetic reluctance can be lowered.

This projection can be realized in a simple manner in particular when the stator is not produced from stacks of metal sheets but rather from SMC material.

The projection extends along the axial direction, in particular, as far as the windings that, in the region of the end sides, form the so-called end windings. Therefore, positive properties of the electric motor, e.g. in respect of the magnetic reluctance, can be realized, wherein however the physical size of the electric motor is not increased by the projection.

In particular, a bearing of the rotor is arranged outside the stator along the axial direction. In particular, the rotor extends beyond the extent of the stator, that is to say at least beyond an end side, along the axial direction. In particular, the rotor is mounted by means of at least one roller bearing (at least with respect to the radial direction, possibly additionally with respect to the axial direction). The rotor is preferably mounted on both end sides of the stator (with respect to a radial direction).

In particular, the rotor has a structure for conveying a fluid along the axial direction through an intermediate space formed between the rotor and the stator. During operation of the motor, the structure, in particular, displaces the fluid in the axial direction, so that a fluid flow through the intermediate space can be generated.

As a result of the arrangement of some of the windings outside the intermediate space or outside the stator in the radial direction, a throughflow cross section of the motor or of the intermediate space can be configured to be as large as possible. Furthermore, the throughflow cross section can be maximized by way of the design of the motor with only two stator teeth.

The invention further proposes an arrangement, at least comprising the described motor and at least one voltage source. The at least one first winding and the second winding are arranged in relation to one another and (electrically) connected to one another such that an electric current can flow through them in opposite directions.

In particular, the first winding and the second winding are arranged in relation to one another and electrically connected to one another such that a magnetic flux, which can be generated by the respective winding during operation of the electric motor, is directed through the circumferential surface along opposite circumferential directions in the region of the stator slots and is added up in the region of the stator teeth and can be conducted across the stator teeth and the rotor along the radial direction.

The statements made relating to the motor apply, in particular equally, to the arrangement, and vice versa.

By way of precaution, it is pointed out that the numerical words used here ("first", "second", "third", . . . ) serve primarily (only) for distinguishing between several similar objects, dimensions or processes, that is to say in particular do not imperatively predefine a dependency and/or sequence of said objects, dimensions or processes. If a dependency and/or sequence is necessary, this will be explicitly stated here, or will emerge in an obvious manner to a person skilled in the art from a study of the embodiment being specifically described.

The invention and the technical field will be discussed in more detail below on the basis of the figures. It is pointed out that the invention is not intended to be restricted by the exemplary embodiments shown. In particular, unless explicitly presented otherwise, it is also possible for partial aspects of the substantive matter discussed in the figures to be extracted and combined with other constituent parts and knowledge from the present description and/or figures. The same reference signs are used to denote identical objects, such that, where appropriate, explanations from other figures can be taken into consideration in a supplementary manner. In the figures, in each case schematically:

FIG. 1 shows a perspective view, partially in section, of an arrangement comprising an electric motor;

FIG. 2 shows the electric motor of the arrangement according to FIG. 1 in a view along the rotation axis;

FIG. 3 shows the electric motor according to FIG. 2 in a view along the rotation axis with a course of the magnetic flux;

Figure 4:
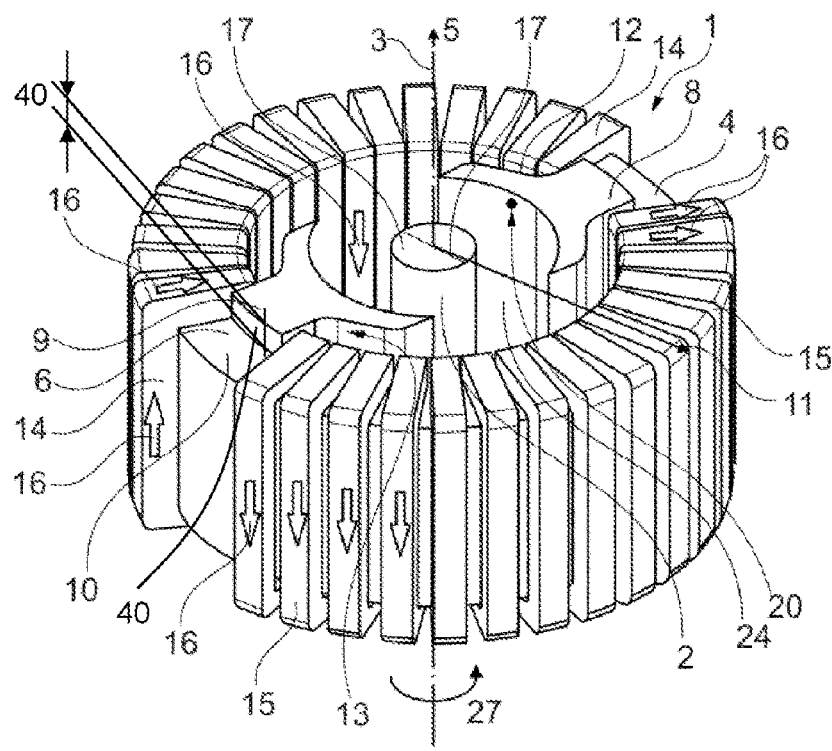
FIG. 4 shows a perspective view of the electric motor according to FIGS. 2 and 3.

FIG. 1 shows a perspective view, partially in section, of an arrangement 25 comprising an electric motor 1. FIG. 2 shows the electric motor 1 of the arrangement 25 according to FIG. 1 in a view along the rotation axis 3. FIG. 3 shows the electric motor 1 according to FIG. 2 in a view along the rotation axis 3 with a course of the magnetic flux 30. FIG. 4 shows a perspective view of the electric motor 1 according to FIGS. 2 and 3. FIGS. 1 to 4 will be described together in the text which follows.

The electric motor 1 comprises a rotor 2 with a rotation axis 3 and comprises an annular stator 4 which surrounds the rotor 2 and is arranged coaxially to the rotor 2. The stator 4 extends along an axial direction 5 that is parallel to the rotation axis 3 and respectively has a first end side 6 and a second end side 7 that point in opposite axial directions 5. The stator 4 has precisely two stator teeth 8, 9 which, starting from an annular circumferential surface 10 of the stator 4, which circumferential surface extends between the end sides 5, 6, extend along a radial direction 11 inward toward the rotor 2 and are arranged opposite one another with respect to the rotation axis 3 (that is to say offset in relation to one another through 180 angular degrees in a circumferential direction 27). A first stator slot 12 and a second stator slot 13, which is arranged opposite with respect to the rotation axis 3, extend along the circumferential surface 10 between the first stator tooth 8 and the second stator tooth 9. A plurality of first windings 14 are arranged in the first stator slot 12 and a plurality of second windings 15 are arranged in the second stator slot 13, wherein each winding 14 extends over the end sides 6, 7 and on the outside and on the inside in the radial direction 11 around the circumferential surface 10. In FIGS. 1 to 3, the parts of each of the windings 14, 15 that extend along the end sides 6, 7 along the radial direction 11 are cut away and therefore not illustrated. The complete windings 14, 15 are illustrated only in FIG. 4.

The windings 14, 15 do not extend around the stator teeth 8, 9, but rather only around the annular circumferential surface 10. Individual windings 14, 15 are arranged adjacent to one another along the circumferential direction 27.

The first winding 14 and the second windings 14, 15 are arranged in relation to one another and electrically connected to one another such that a magnetic flux 30, which can be generated by the respective winding 14, 15 during operation of the electric motor 1, is directed through the circumferential surface 10 (the main body of the stator 4) along opposite circumferential directions 27 in the region of the stator slots 12, 13 and is added up in the region of the stator teeth 8, 9 and can be conducted across the stator teeth 8, 9 and the rotor 2 along the radial direction 11 (see FIGS. 1, 3 and 4).

Here, the first windings 14 and the second windings 15 are connected to one another in parallel. The first windings 14 and the second windings 15 are windings 14, 15 that are independent of one another.

A plurality of windings 14, 15 are arranged in each stator slot 12, 13, wherein the windings 14, 15 of one stator slot 12, 13 (that is to say first windings 14 in the first stator slot 12 or second windings 15 in the second stator slot 13) are connected to one another in series (see indication in FIG. 1). Therefore, here, the first windings 14 are connected to one another in series. Furthermore, the second windings 15 are connected to one another in series. The first windings 14 and the second windings 15 are connected to one another in parallel.

Here, an identical number of windings 14, 15 are arranged in the two stator slots 12, 13.

One winding 14, 15 extends at least along the axial direction 5 along the circumferential surfaces 10 (that is to say on the outside and on the inside of the circumferential surface 10) and along the radial direction 11 beyond the end sides 6, 7 of the annular stator 4 and in so doing over the end sides 6, 7 and in the radial direction 11 on the outside and on the inside around the circumferential surface 10.

The arrangement of the windings 14, 15 through which an electric current 16 flows in opposite directions in stator slots 12, 13 that are separated from one another by the two stator teeth 8, 9 allows the magnetic field lines (or the magnetic flux 30) to be conducted along the circumferential direction 27 through the main body of the stator 4 and through the winding 14, 15 toward the stator tooth 8, 9. At the first stator tooth 8, the magnetic field lines (the magnetic flux 30) exit from the windings 14, 15 of the opposite stator slots 12, 13 and are guided along the radial direction 11 through the first stator tooth 8 toward the rotor 2 and across the rotor 2 toward the second stator tooth 9. At this second stator tooth 9, the magnetic field lines (the magnetic flux 30) are guided toward the main body of the stator 4 and there passed on through the windings 14, 15 and through the main body of the stator 4 in the circumferential direction 27. The different polarized ends of each winding 14, 15 or of the electrical conductor that forms the at least one winding 14, 15 in the respective stator slot 12, 13 are therefore at a maximum distance from one another, and therefore a stray field is as small as possible. One end of the electrical conductor of a stator slot is arranged, in particular, in the immediate vicinity of one stator tooth 8, 9 and the other end is arranged in the immediate vicinity of the other stator tooth 9, 8 (see FIG. 1).

In this embodiment of an electric motor 1, a stray field can be kept small, wherein an air gap or distance 18 between the stator tooth 8, 9 and the rotor 2 can be designed to be particularly large. Therefore, the diameter of the rotor 2 can be designed to be small, and therefore the intermediate space 24 of the motor 1 can be realized with a large throughflow cross section.

The stator teeth 8, 9, starting from an annular circumferential surface 10 of the stator 4, which circumferential surface extends between the end sides 6, 7, extend along a radial direction 11 inward toward the rotor 2 as far as an inner circumferential surface 20 of the stator tooth 8, 9. Along this extent 33, the stator tooth 8, 9 has a tapered portion 34 with respect to the circumferential direction 27, i.e. a width of the stator tooth 8, 9, which width extends in the circumferential direction 27, is at minimum between the circumferential surface 10 of the stator 4, which circumferential surface points inward in the radial direction 11, and the inner circumferential surface 20 of the stator tooth 8, 9.

The inner circumferential surface 20 of the stator teeth 8, 9 is of wider design along the circumferential direction 27 than the region of the stator tooth 8, 9 between the circumferential surface 10 of the stator 4 and the tapered portion 34.

The stator tooth 8, 9 extends along the radial direction 11 and, starting from the circumferential surface 10 of the stator 4, over a first section 35 toward the tapered portion 34 and, starting from the tapered portion 34, over a second section 36 toward the inner circumferential surface 20.

The second section 36 extends in the circumferential direction 27 over a second angular range 38 of approximately 90 angular degrees which exceeds a greatest first angular range 37 of approximately 30 angular degrees of the first section 35 by approximately 200%. The angular range 37, 38 is determined starting from a rotation axis 3 of the motor 1.

The first section 35 as far as the tapered portion 34 extends starting from the circumferential surface 10 of the stator 4 and along the radial direction 11 inward beyond the windings 14, 15.

The first section 35 comprises approximately 75% of the extent 33 of the stator tooth 8, 9 along the radial direction 11.

The two stator slots 12, 13 each extend over a third angular range 39 of approximately 150 angular degrees along the circumferential direction 27.

The at least one winding 14, 15, which extends around the circumferential surface 10 of the stator 4 and is arranged only in one stator slot 12, 13, extends over a proportion of approximately 97% of this third angular range 39.

The rotor 2 has (next to one another along the circumferential direction 27) two poles 17 of a permanent magnet, which two poles are respectively magnetized in the radial direction 11 (see FIG. 2). The poles 17 are arranged offset in relation to one another through 180 angular degrees along the circumferential direction 27 and point in opposite radial directions 11. The poles 17 are separated from one another by a boundary which extends transversely to an extent 33 of the stator teeth 8, 9 here (dashed line in FIG. 2).

A smallest distance 18 between an outer circumferential surface 19 of the rotor 2 and an inner circumferential surface 20 of the stator teeth 8, 9 is at least 5 millimeters.

FIGS. 1 and 4 show that the stator teeth 8, 9 extend beyond the two end sides 6, 7 along the axial direction 5 and in so doing form a projection 40 on each end side 6, 7. This projection 40 extends over the entire extent 33 of the respective stator tooth 8, 9 along the radial direction 11. Therefore, the inner circumferential surface 20 of the respective stator tooth 8, 9, which inner circumferential surface is situated opposite the rotor 2, can be increased in size, so that, with a given electric current, a magnetic flux density in the region of the inner circumferential surface 20 of the stator teeth 8, 9 can be reduced and a magnetic reluctance can be lowered.

A bearing 21 of the rotor 2 is arranged outside the stator 4 along the axial direction 5. The rotor 2 (but in particular not the poles 17 of the magnet) extends beyond the extent of the stator 4, that is to say at least beyond an end side 6, 7, here the first end side 6, along the axial direction 5. The poles 17 may possibly also extend beyond the extent of the stator 4, so that a possible torque can be increased.

The rotor 2 has a structure 22 for conveying a fluid 23 along the axial direction 5 through an intermediate space 24 formed between the rotor 2 and the stator 4. During operation of the motor 1, the structure 23 displaces the fluid 23 in the axial direction 5, so that a fluid flow through the intermediate space 24 can be generated.

The arrangement 25 illustrated in FIG. 1 comprises the motor 1 and a voltage source 26. The voltage source 26 is, in particular, a sinusoidal source (and not a DC source) or a switchable voltage source or power electronics system. The plurality of first windings 14 and the plurality of second windings 15 are arranged in relation to one another and connected such that an electric current 16 can flow through them in opposite directions, so that a magnetic flux 30, starting from the poles 17 of the magnet, is conducted across the stator teeth 8, 9 in the radial direction 11 into the circumferential surface 10 of the stator 4 and through the circumferential surface 10 of the stator 4 along the circumferential direction 27.

Figure 5:
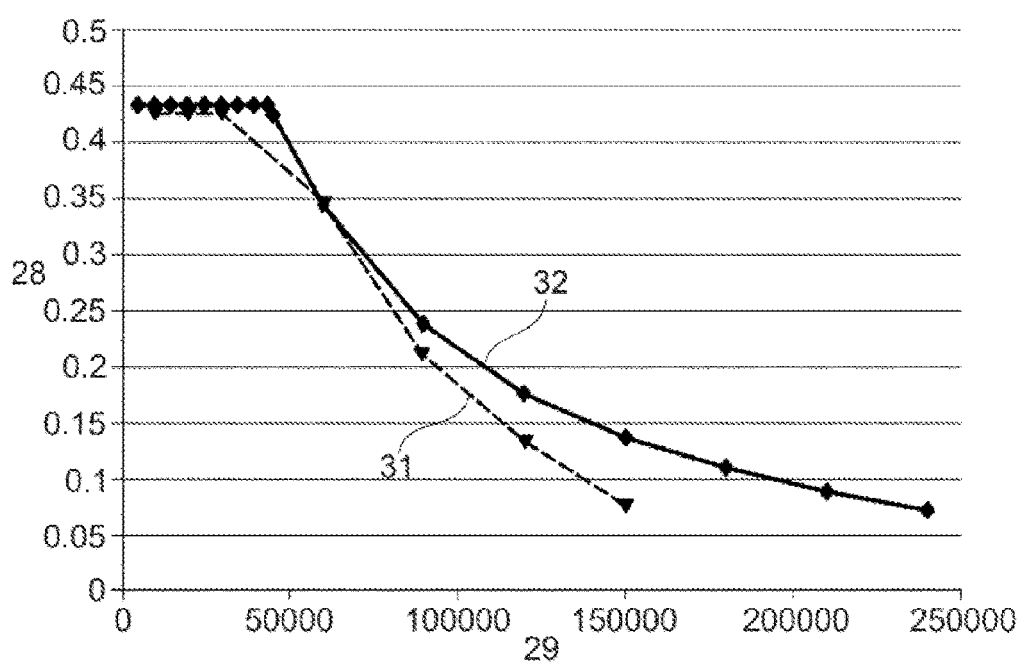
FIG. 5 shows a graph.

FIG. 5 shows a graph. A rotation speed 29 in revolutions per minute of the electric motor 1 is plotted on the horizontal axis. A torque 28, which can be generated by the electric motor 1, in Newton meters is plotted on the vertical axis. The first profile 31 shows the torque 28 of an electric motor 1 of different construction. The second profile 32 shows the achievable torque 28 of the electric motor 1 described here, which achievable torque is higher at almost all operating points.

LIST OF REFERENCE SIGNS

1 Motor
2 Rotor
3 Rotation axis
4 Stator
5 Axial direction
6 First end side
7 Second end side
8 First stator tooth
9 Second stator tooth
10 Circumferential surface
11 Radial direction
12 First stator slot
13 Second stator slot
14 First winding
15 Second winding
16 Current [amperes], that is to say [A]
17 Pole
18 Distance
19 Outer circumferential surface
20 Inner circumferential surface
21 Bearing
22 Structure
23 Fluid
24 Intermediate space
25 Arrangement
26 Voltage source
27 Circumferential direction
28 Torque [Newton meters], that is to say [Nm]
29 Rotation speed [revolutions per minute], that is to say [rpm]
30 Magnetic flux [Tesla square meters], that is to say [T*m$^2$]
31 First profile
32 Second profile
33 Extent
34 Tapered portion
35 First section
36 Second section
37 First angular range
38 Second angular range 39 Third angular range
40 Projection

The invention claimed is:

1. An electric motor comprising a rotor with a rotation axis and an annular stator which surrounds the rotor, extends along an axial direction that is parallel to the rotation axis and respectively has a first end side and a second end side that point in opposite axial directions; wherein the stator has precisely two stator teeth which, starting from an annular circumferential surface of the stator, which circumferential surface extends between the end sides, extend along a radial direction inward toward the rotor and are arranged opposite one another with respect to the rotation axis, wherein a first stator slot and a second stator slot, which is arranged opposite with respect to the rotation axis, extend along the circumferential surface between the stator teeth; wherein at least one first winding is arranged in the first stator slot and at least one second winding is arranged in the second stator slot, wherein each winding extends over the end sides and on the outside and on the inside in the radial direction around the annular circumferential surface, wherein a smallest distance between an outer circumferential surface of the rotor and an inner circumferential surface of the stator teeth is between 5 and 20 millimeters.

2. The electric motor as claimed in claim 1, wherein the first winding and the second winding are arranged in relation to one another and electrically connected to one another such that a magnetic flux, which can be generated by the respective winding during operation, is directed through the circumferential surface along opposite circumferential directions in the region of the stator slots and is added up in the region of the stator teeth and can be conducted across the stator teeth and the rotor along the radial direction.

3. The electric motor as claimed in claim 2, wherein the at least one first winding and the at least one second winding are connected to one another in parallel.

4. The electric motor as claimed in claim 2, wherein the at least one first winding and the at least one second winding are connected to one another in series.

5. The electric motor as claimed in claim 1, wherein a plurality of windings are arranged in each stator slot, wherein at least the windings of one stator slot are connected to one another in parallel or in series.

6. The electric motor as claimed in claim 1, wherein at least one stator tooth, starting from the annular circumferential surface, extends along a radial direction inward toward the rotor and as far as an inner circumferential surface of the stator tooth and, along this extent, has a tapered portion with respect to a circumferential direction.

7. The electric motor as claimed claim 1, wherein at least one of the stator teeth extends beyond the at least one end side along the axial direction and forms a projection.

8. The electric motor as claimed in claim 1, wherein the rotor has a structure for conveying a fluid along the axial direction through an intermediate space formed between the rotor and the stator.

9. An arrangement, at least comprising an electric motor as claimed in claim 1, and at least one voltage source, wherein the first winding and the second winding are arranged in relation to one another and connected such that an electric current can flow through them in opposite directions.

10. The electric motor as claimed in claim 1, wherein the smallest distance between the outer circumferential surface of the rotor and the inner circumferential surface of the stator teeth is at least 10 millimeters.

* * * * *